United States Patent [19]

Boom et al.

[11] Patent Number: 5,610,374

[45] Date of Patent: Mar. 11, 1997

[54] SAFETY STRING POLLING SYSTEM

[75] Inventors: Anthony S. Boom, Moline; John M. Bril, Rapid City, both of Ill.

[73] Assignee: Montgomery Kone Inc., Moline, Ill.

[21] Appl. No.: 641,837

[22] Filed: May 2, 1996

Related U.S. Application Data

[63] Continuation of Ser. No. 240,913, May 10, 1994, abandoned.

[51] Int. Cl.$^6$ .................... B66B 3/00; B66B 1/28
[52] U.S. Cl. .................... 187/391; 187/280; 187/247
[58] Field of Search .................... 187/280, 247, 187/393, 316, 391

[56] References Cited

U.S. PATENT DOCUMENTS

| | | | |
|---|---|---|---|
| 4,367,810 | 1/1983 | Doane et al. | 187/29 R |
| 4,736,367 | 4/1988 | Wroblewski et al. | 370/85 |
| 4,809,177 | 2/1989 | Windle et al. | 364/424.01 |
| 4,864,519 | 9/1989 | Appleby et al. | 364/550 |
| 4,898,263 | 2/1990 | Manske et al. | 187/133 |
| 4,980,913 | 12/1990 | Skret | 380/23 |
| 5,107,964 | 4/1992 | Coste et al. | 187/104 |
| 5,383,535 | 1/1995 | Ando | 187/247 |
| 5,487,448 | 1/1996 | Schollkopf et al. | 187/247 |

FOREIGN PATENT DOCUMENTS

| | | |
|---|---|---|
| 4112626A | 10/1992 | Germany. |
| WO92/18410 | 10/1992 | WIPO. |

*Primary Examiner*—Robert Nappi
*Attorney, Agent, or Firm*—Wood, Phillips, VanSanten, Clark & Mortimer

[57] ABSTRACT

A method of and apparatus for detecting the operative status of each of a series of remote stations connected to a main control in an elevator system includes a step or apparatus for causing the main controller to develop a roll call signal which is transferred to a first of the series of remote stations, transmitting an operative status reply signal from the remote station to the main controller if the remote station is functional following receipt of the roll call signal by the remote station, transferring the roll call signal to a next of the series of remote stations after the reply signal is sent to the main controller, and continuing to transmit an operative status reply signal until each of the remote stations has done the same, if operative.

24 Claims, 7 Drawing Sheets

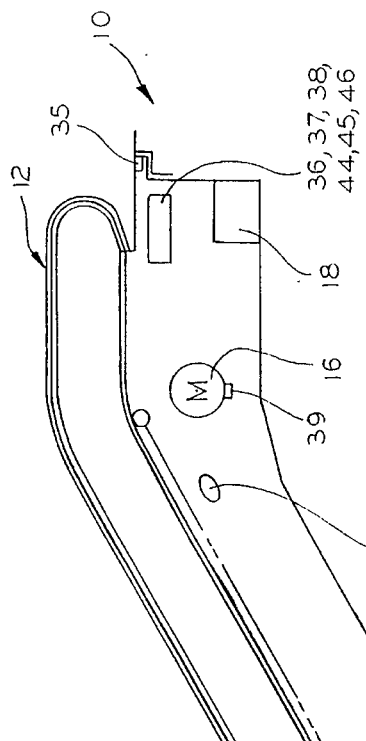
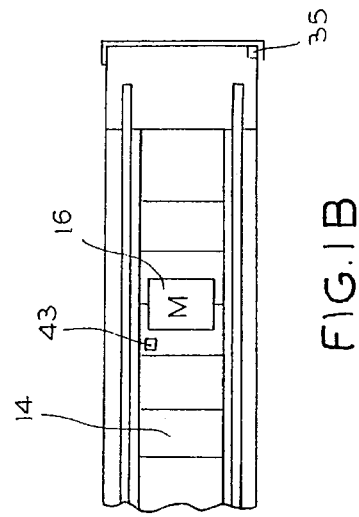
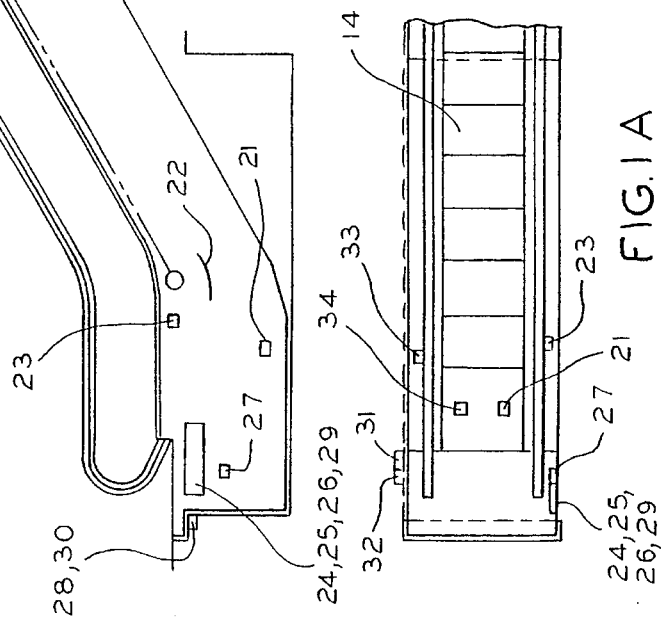

1

SAFETY STRING POLLING SYSTEM

This is a continuation of application Ser. No. 08/240,913, filed May 10, 1994, now abandoned.

FIELD OF THE INVENTION

The present invention relates to elevator and escalator systems and, more particularly, to a polling system for a safety string using smart switches.

BACKGROUND OF THE INVENTION

Both elevator and escalator systems include a plurality of safety devices which are monitored to ensure proper operation. Typically, these devices are used to provide shutdown of the escalator or elevator when an undesirable condition exists. A typical such system includes a plurality of series connected contacts so that if one contact opens, the safety circuit opens. The safety circuit is commonly referred to as a "safety string".

A difficulty with a typical safety string circuit exists when trouble shooting is required. When a contact in the string opens, it is not readily apparent which contact has opened. The typical elevator or escalator system may include twenty or more contacts in the safety string. Desirably, trouble-shooting can be done from a central location.

A device known as a "smart switch" has been developed. A smart switch typically includes a switch connected to a microcontroller. The microcontroller can be connected to a main controller using a serial link. In an elevator or escalator system, a smart switch can be used for each of the devices in the safety string, with the microcontroller of each device providing status information to the main controller. With the use of smart switches, the hard wired safety string circuit remains with the microcontroller of each providing switch status information to the main controller so that the main controller can identify which device in the string has sensed an error condition.

A further problem remains in that the smart switch could fail with its contact in a closed condition, so that any further error would not be sensed. Desirably, the main controller should be able to detect the operability of the safety switches in the elevator or escalator system.

Similarly, with elevator systems the main controller responds to service commands issued at call stations located remotely from the main controller. These call stations may also use smart switches connected to the main controller for which operability should be determined.

The present invention is directed to solving one or more of the problems discussed above in a novel and simple manner.

SUMMARY OF THE INVENTION

In accordance with the invention, an escalator or elevator system including a series of remote stations or safety switches connected to a main controller includes a system for detecting the operative status of the remote stations.

More particularly, a method of and apparatus for detecting the operative status of each of a series of remote stations connected to a main control in an elevator system includes a step or apparatus for causing the main controller to develop a roll call signal which is transferred to a first of the series of remote stations, transmitting an operative status reply signal from the remote station to the main controller if the remote station is functional following receipt of the roll call signal by the remote station, transferring the roll call signal to a next of the series of remote stations after the reply signal is sent to the main controller, and continuing to transmit an operative status reply signal until each of the remote stations has done the same, if operative.

It is a feature of the invention that the main controller is connected to each remote station via a communication link and the reply signal is transmitted on the communication link. The main controller also includes address transmitting means for transmitting address data to the remote station and the reply signal includes the transmitted address data. Also, the main controller address transmitting means transmits new address data to a next of the series of remote stations only after a reply signal is received from one of the series of remote stations.

It is another feature of the invention that each remote station includes means for connecting the remote station to the communication link upon the remote station receiving the roll call signal. Particularly, each remote station includes a relay energized when the remote station receives the roll call signal, whereby contacts associated with the relay are closed to connect a microcontroller of the remote station to the communication link.

Further features and advantages of the invention will be readily apparent from the specification and from the drawing.

BRIEF DESCRIPTION OF THE DRAWING

FIG. 1 is a side elevation view of an escalator system in accordance with the invention;

FIGS. 1A and 1B illustrate partial plan views of the escalator system of FIG. 1;

DETAILED DESCRIPTION OF THE INVENTION

Figure 2:
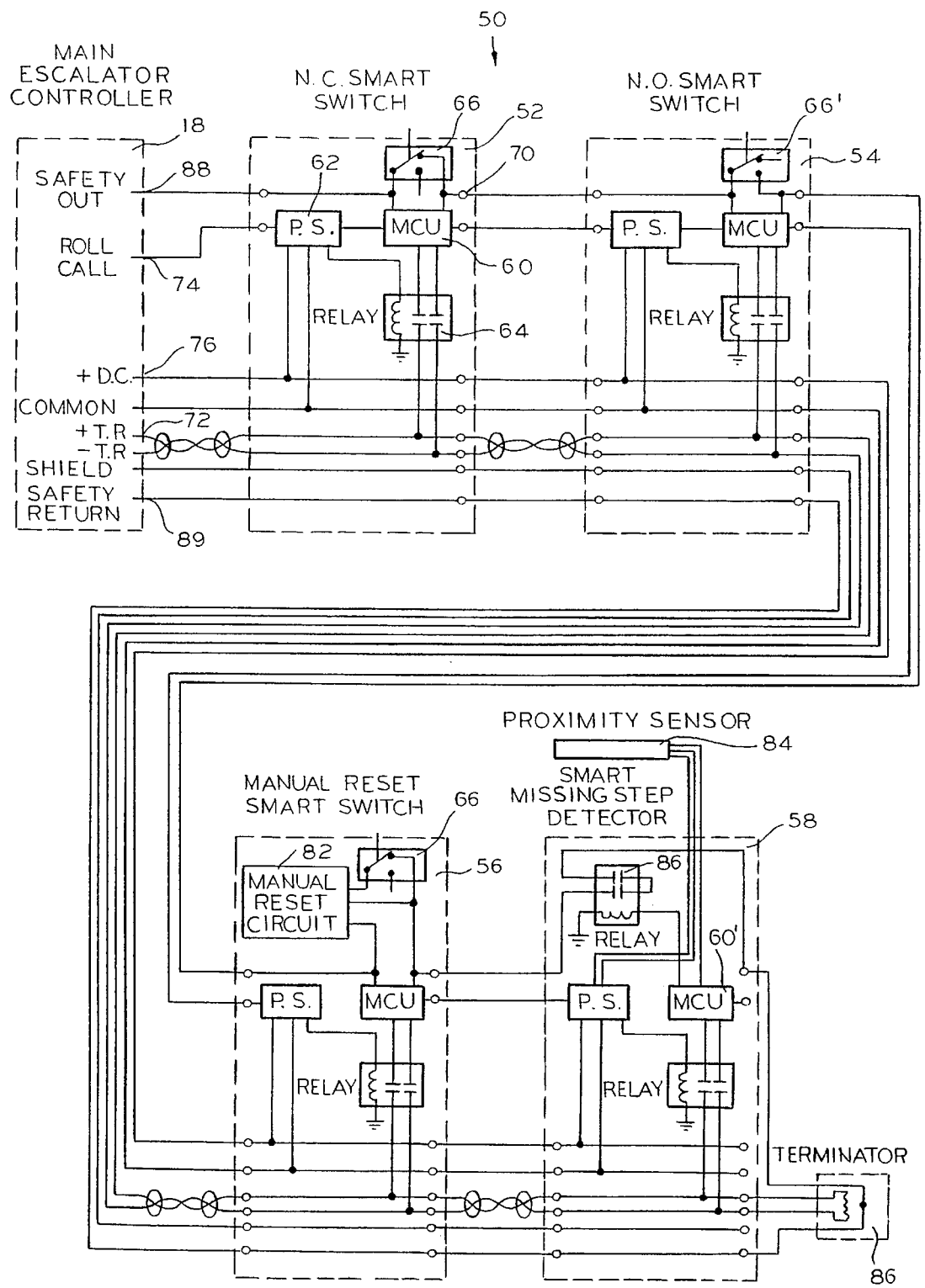
FIG. 2 is an electrical schematic for a smart switch system of the escalator system of FIG. 1.

Referring to FIGS. 1, 1A and 1B, an escalator system 10 is illustrated including a method and apparatus which detects the operative status of each of a series of remote stations, as described below.

The escalator system 10 includes an escalator 12 of conventional construction. The details of construction are not disclosed herein, as the detecting method and apparatus are the same regardless of escalator construction. Generally, the escalator 12 includes a plurality of stairs or steps 14 operatively driven by a motor 16 for causing the steps 14 to move up or down.

The invention is particularly concerned with an electrical control system for the escalator system 10. The escalator system 10 includes a main controller, illustrated in block form at 18, connected to a plurality of switches. Particularly, a typical escalator control system includes a safety string comprising a plurality of sensing devices. Each sensing device has a switch with an electrical contact. The electrical contacts are connected in series to the main controller 18. If any error is sensed, then the particular device opens its switch contact to open the safety string so that the main escalator controller 18 shuts down the motor 16.

The particular sensing devices used are not critical to the invention. For simplicity, the general location and description of conventional such switches is described herein as background for the types of switches which can be used in connection with the invention.

The following table identifies by reference numeral the sensing devices shown:

| SWITCH NUMBER | SWITCH DESCRIPTION |
| --- | --- |
| 21 | Lower Level Step Switch |
| 22 | Upper Thrust Switch |
| 23 | Lower Skirt Switch |
| 24 | Lower Missing Step Switch |
| 25 | Lower Combplate Switch |
| 26 | Lower HR Inlet Switch |
| 27 | Lower Station Switch |
| 28 | Lower Pit Switch |
| 29 | Lower 'E' Stop |
| 30 | Lower Access Switch |
| 31 | LL Station Switch |
| 32 | LL HR Inlet Switch |
| 33 | LL Skirt Switch |
| 34 | LL Level Step Switch |
| 35 | Upper Access CVR Switch |
| 36 | Upper HR Inlet Switch |
| 37 | Upper Combplate Switch |
| 38 | Upper Skirt Switch |
| 39 | Brake Temp Switch |
| 40 | Master Stop Switch |
| 41 | Upper Missing Step Detector |
| 42 | Upper Level Step Switch |
| 43 | UL Level Step Switch |
| 44 | UL Skirt Switch |
| 45 | UL HR Inlet Switch |
| 46 | Upper 'E' Stop |

With reference to FIG. 2, a schematic diagram illustrates a safety string circuit 50 in accordance with the invention. The illustrated safety string circuit includes the main escalator controller 18 and four smart switches 52, 54, 56 and 58. In fact, up to thirty-two smart switches could be used in the safety string circuit 50. Particularly, in the escalator system 10, above, one smart switch would be provided for each of the sensing devices identified in the table. The circuit 50 is intended to be representative of a basic circuit using smart switches in four different configurations.

The first smart switch 52 comprises a normally closed smart switch. The smart switch 52 includes microcontroller unit (MCU) 60, a power supply 62, a relay 64 and a two position switch 66. The switch 66 is hardwired in a normally closed configuration. The switch 66 is connected to the MCU 60. The MCU 60 may be, for example, a Motorola type MC68HC05J1 integrated circuit chip. The MCU 60 includes a serial output connected through contacts of the relay 64. The power supply 62 powers the MCU 60 and a coil of the relay 64.

The second smart switch 54 is similar to the smart switch 52, except that a switch 66' is hardwired for use in a normally open configuration. The third smart switch 56 is also similar, except that a manual reset circuit 82 is provided for manually resetting the normally closed switch 66. The fourth smart switch 58 is set up for use as a missing step detector, such as switches 24 and 41, see FIG. 1. The missing step smart switch 58 differs in that instead of a two position switch a proximity sensor 84 is connected to the MCU 60 which in turn drives a relay 86 including a pair of series connected contacts used in the safety string. The MCU 60 of the missing step smart switch 58 may comprise, for example, a Motorola type MC68HC705J2 integrated circuit chip.

The main escalator controller 18 may comprise any conventional programmed microcomputer system. The main escalator controller 18 includes a serial port connected via a communication link 72, and through the contacts of the relay 64, to the MCU 60 of each smart switch 52, 54, 56 and 58.

The main escalator controller 18 includes a safety out 88 and safety return 89 for connection to the safety string. Particularly, the safety out 88 is connected to the series connection of the switches, such as the switch 66, of the four smart switches 52, 54, 56 and 58, and then returned through a terminator 88 to the safety return 89.

The power supply 62 of the first smart switch 52 is enabled by a roll call signal developed on a line from a roll call output 74 of the main escalator controller 18. The roll call signal is then passed, as discussed below, from the MCU 60 of the first smart switch 52, to the next smart switch 54, and so on. Voltage to each power supply 62 is received from a DC supply 76 of the main escalator controller 18.

As mentioned above, the safety string consists of the safety out 88 from the main escalator controller 18 being connected to the series connection of the switch 66 of each of the smart switches 52, 54, 56 and 58. During normal operation, each of the contacts in the string is closed. If any switch opens, then the main escalator controller 18 senses an error condition. The main escalator controller 18 can determine which of the devices sensed an error condition by polling the MCU 60 of each smart switch 52, 54, 56 and 58.

In accordance with the invention, the main escalator controller 18 is also operable to initiate a roll call sequence in which the switches 52, 54, 56 and 58 are sequentially polled to determine the operative status of each.

Figure 3:
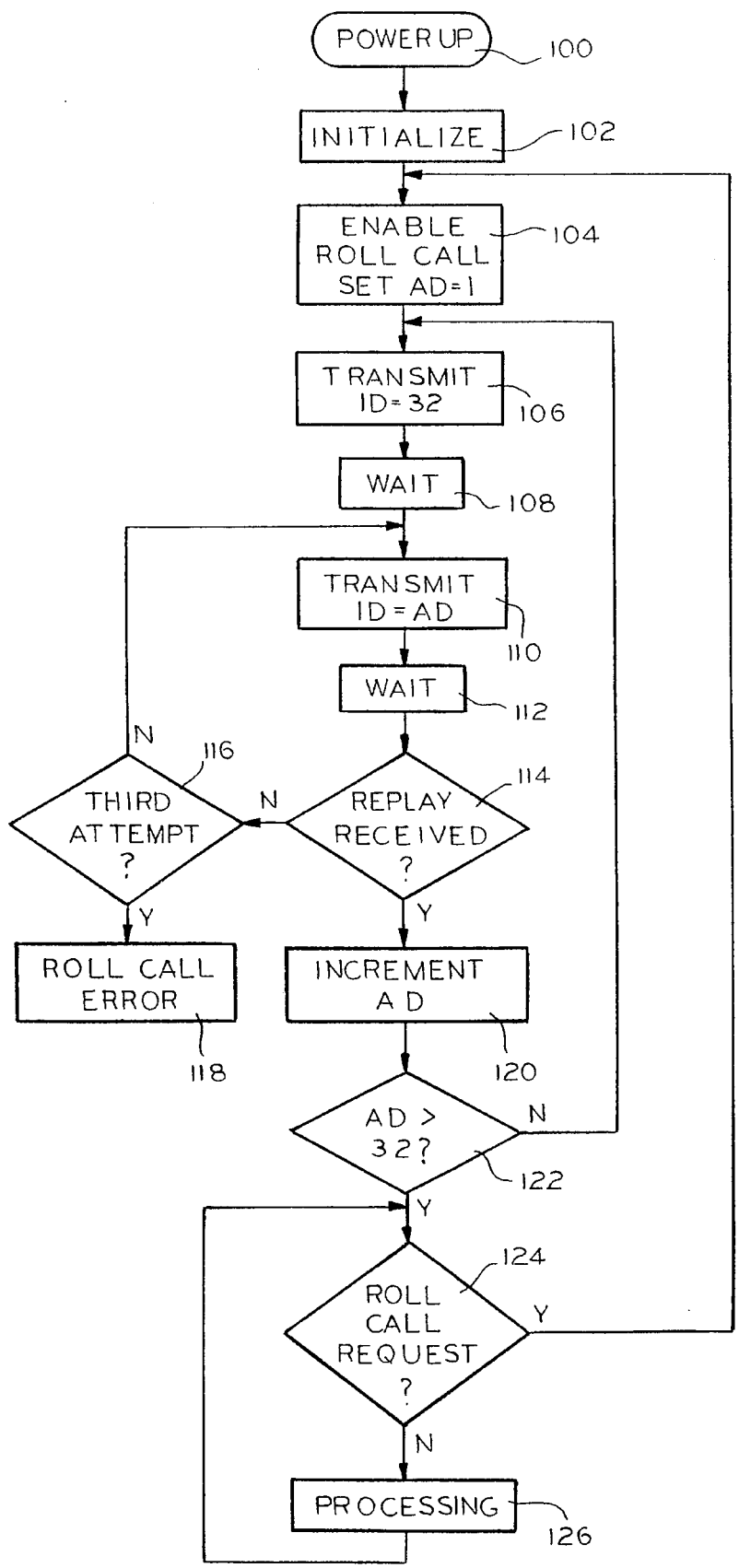
FIG. 3 is a flow diagram illustrating a portion of a control program implemented in the main escalator controller of FIG. 2.

With reference to FIG. 3, a flow chart illustrates a program implemented in the main escalator controller 18 for the roll call sequence. The flow chart begins at a node 100 at power-up, followed by a standard initialization routine at a block 102. The roll call sequence is enabled at a block 104 and an address register AD is set equal to one. The roll call sequence is enabled by developing the roll call signal at the output 74, see FIG. 2, to the first smart switch 52. The corresponding operation of the smart switch 52 is discussed below.

Thereafter, an ID value of thirty-two is transmitted on the communication link 72 at a block 106. The controller 18 waits a select time at a block 108 and then at a block 110 a data message is again transmitted on the communication link 72 comprising the ID value being set equal to the value of the address register AD. The controller then waits a select time at a block 112. A decision block 114 determines if a reply is received from the first smart switch 52. If not, then a decision block 116 determines if three attempts of transmitting the ID have been made. If not, then control returns to the block 110. If after the third attempt no reply is received, then a roll call error is noted at a block 118 and the roll call process comes to an end.

If a reply is received at the block 114, then the register value AD is incremented at a block 120. A decision block 122 then determines if the value in the AD register is greater than thirty-two. The maximum number of smart switches is thirty-two. As can be appreciated, if fewer than thirty-two smart switches are used, then the value thirty-two is replaced by a value corresponding to the total number of smart switches in the circuit 50 of FIG. 2. If the value in the register AD is not greater than thirty-two, then the control loops back to the block 106 where the roll call can be performed on the next in the series of smart switches. This loop continues until a roll call reply has been received from all of the included smart switches.

After the roll call sequence is complete, a decision block 124 determines if a further request to implement roll call has been made. This request can be made periodically or manually, as advantageous or desired. If so, then control proceeds to the block 104 to again enable the roll call sequence. If not, then control advances to a block 126 for the main escalator controller to implement any other processing routines that are required, such as the periodic polling of smart switches as discussed above, as well as control of the motor 16 and various other conventional control parameters. Control then returns to the decision block 124 to determine if a roll call request has been made.

Figure 4:
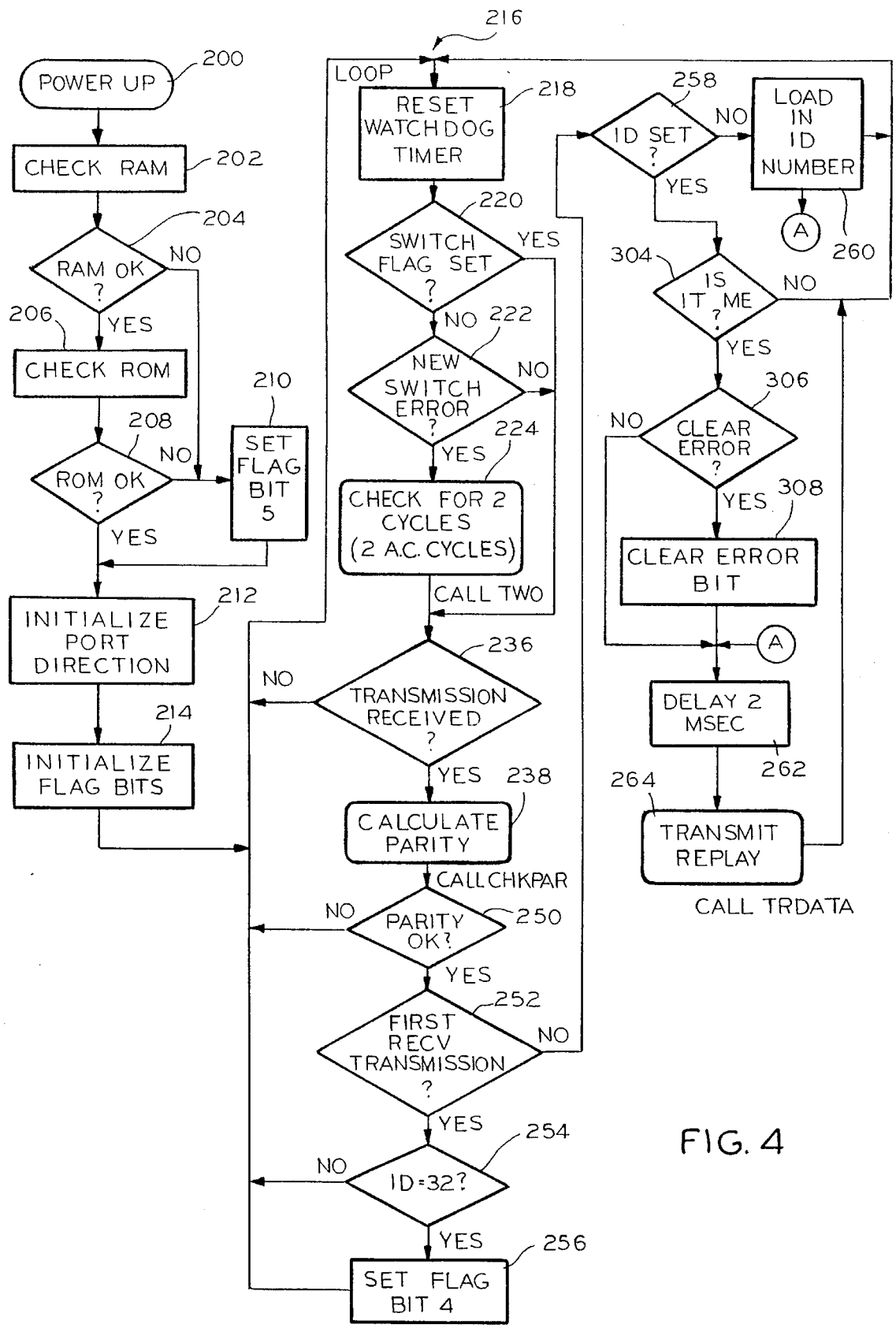
FIGS. 4–8 comprise flow diagrams illustrating operation of programs implemented in the microcontrollers of the smart switches of FIG. 2.

With reference to FIG. 4, a flow diagram illustrates operation of a main routine implemented in the MCU 60 of each of the smart switches 52, 54, 56 and 58. The routine begins upon power-up at a node 200. Particularly, power-up occurs when the power supply 62 is enabled as by receiving a roll call signal either from the main escalator controller 18 or the prior in the series of smart switches. The microcontroller unit RAM is checked at a block 202. A decision block 204 determines if the RAM is OK. If so, then ROM is checked at a block 206 and a decision block 208 determines if the ROM is OK. If either the RAM or ROM is not OK, then a flag bit 5 is set at a block 210. In any event, control then advances to a block 212 to initialize the port direction. This sets the particular pins as inputs or outputs. The flag bits are then initialized at a block 214 and then control proceeds to a main control loop 216.

The main control loop 216 begins at a block 218 which resets the watchdog timer. A decision block 220 then determines if the switch flag is set. The switch flag is set if an error condition has previously been sensed, such as the associated safety switch contact being open. If the switch flag is not set, then a decision block 222 determines if a new switch error is sensed. This condition occurs the first pass through the loop 216 after the switch opens. If so, then a routine for checking contact status for two cycles is implemented at a block 224 as by calling a two cycles routine.

Figure 5:
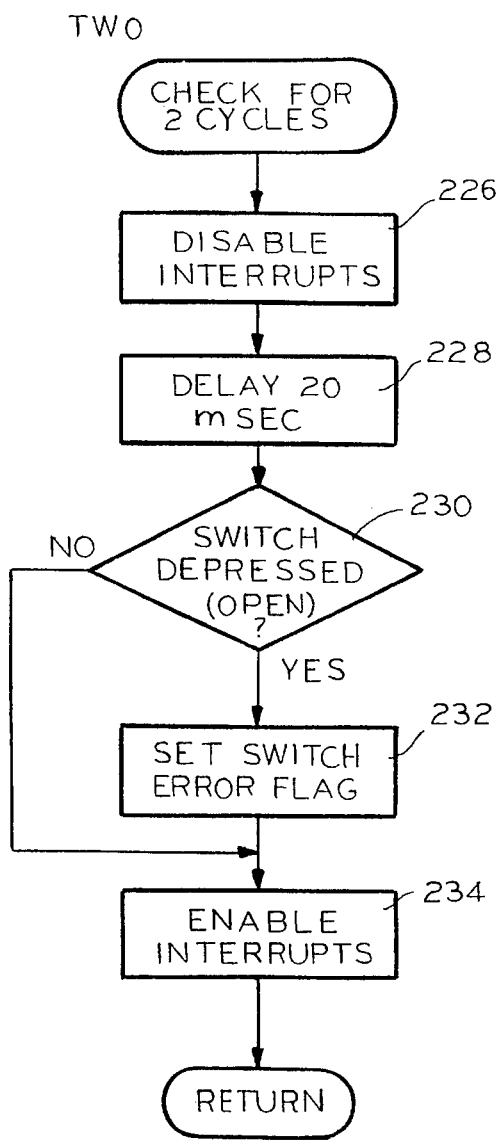

The two cycles routine is illustrated in FIG. 5 beginning at a block 226 which disables all interrupts. The control then implements a twenty millisecond delay at a block 228 so that with 50 Hz power the second transition of AC power is sensed. A decision block 230 then determines if the error signal, i.e., the contact open, is still present. If so, then the switch error flag is set at a block 232. If not, then the error is ignored and the interrupts are enabled at a block 234 and the routine ends as by returning to the main loop 216 of FIG. 4.

Figure 6:
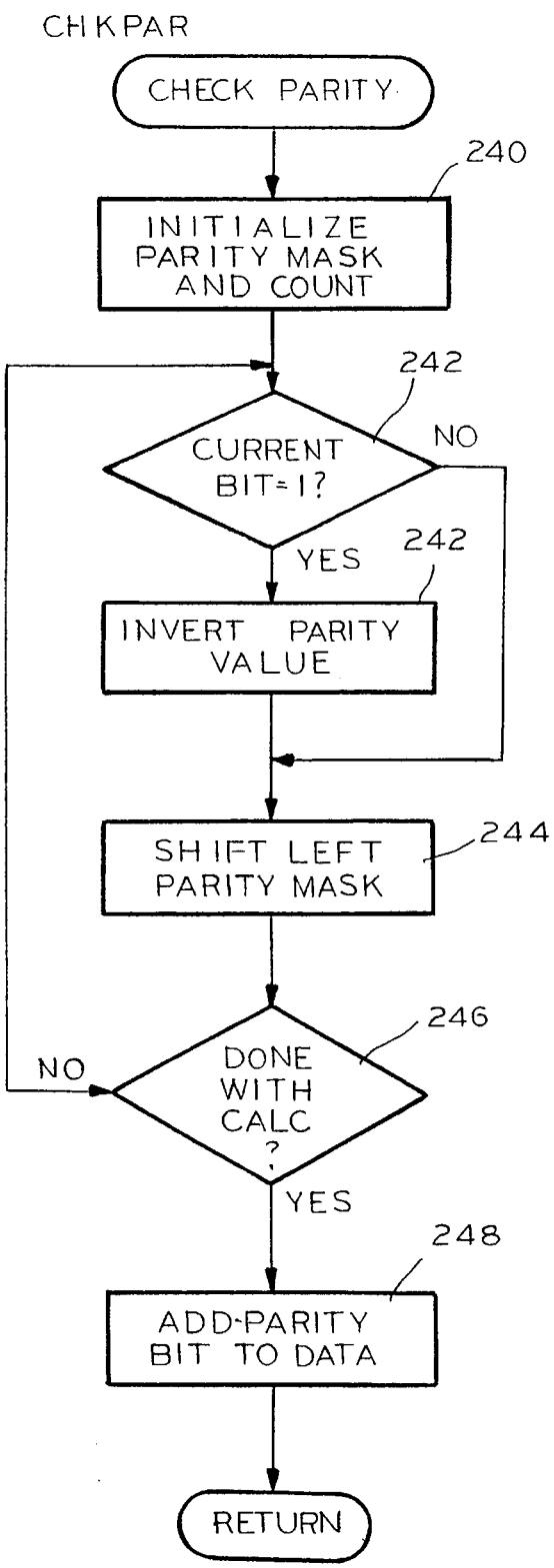

The main loop control then continues at a block 236 by determining if a transmission has been received from the main controller 18. For example, at power-up a transmission should be received as by the main escalator controller 18 transmitting the ID thirty-two at the block 106, see FIG. 3. If no transmission was received, then control returns to the block 218. If a transmission is received, then the parity is calculated by implementing a CHKPAR routine at a block 238. The CHKPAR routine is illustrated in FIG. 6.

The CHKPAR routine begins at a block 240, to initialize a parity mask and count. A decision block 242 then determines if the current bit is bit number one. If so then the parity value is inverted at a block 242. From either, control proceeds to a block 244 which shifts left the parity mask and a decision block 246 determines if the calculation is done. If not, then control returns to the block 242. If so, then the parity bit is added to the received data at a block 248 and the routine ends. Returning to the main loop 216 of FIG. 4, a decision block 250 then determines if the parity is OK. If not, then the transmission is ignored and control returns to the block 218.

If parity is OK, then a decision block 252 determines if the transmission received was the first transmission. The first transmission should be the ID of thirty-two. This is determined by checking the fourth flag bit to see if it is set, as below. If it is the first transmission, then a decision block 254 determines if the ID received is equal to thirty-two. If not, then control loops back to the block 218. If so, then the fourth flag bit is set at a block 256 and control then returns to the block 218.

The second transmission to the MCU 60 should be the address ID transferred at the block 110, see FIG. 3. Returning to the decision block 252, if the transmission is not the first received transmission, i.e., the fourth flag bit is set, then control proceeds to a decision block 258 which determines if the address ID for the particular smart switch has been set. During the first pass through the loop, the ID is set to the default value thirty-two. If the ID value is still thirty-two, then the ID has not been set and control proceeds to a block 260, which loads in the new ID number. The ID number is the address value transmitted at the block 110 of FIG. 3 from the main controller. Control then proceeds to a block 262 which implements a two millisecond delay. Then, a reply is transmitted by calling a TRDATA routine at a block 264.

Figure 7:
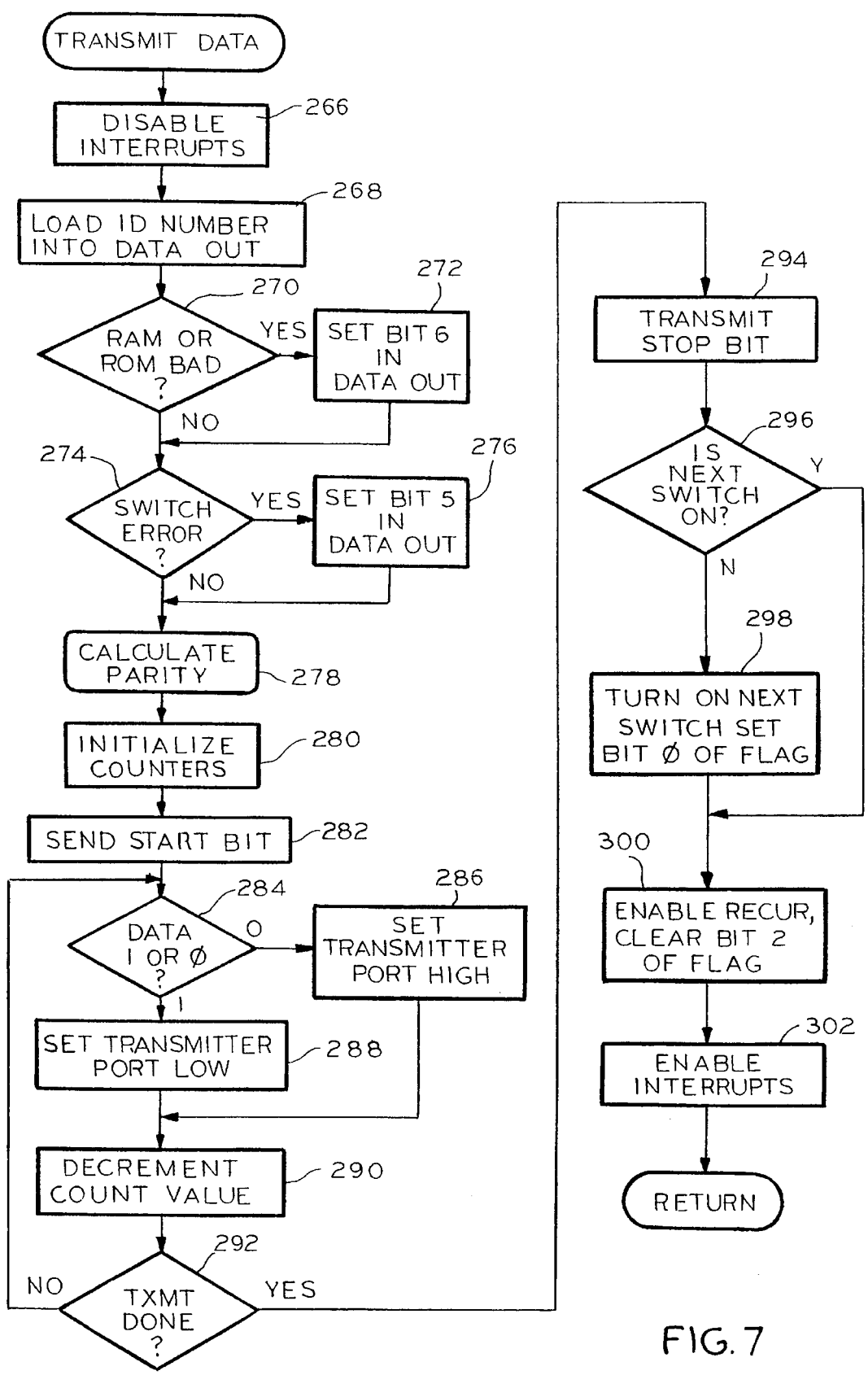

The TRDATA routine is shown in FIG. 7 and begins at a block 266 which disables interrupts. The ID number is then loaded into a data out register at a block 268. A decision block 270 determines if either the RAM or ROM is bad and, if so, sets bit 6 in the data out at a block 272. A decision block 274 then determines if there is a switch error, i.e., the associated switch 66 is open. If so, then bit 5 in the data out register is set at a block 276. The parity is calculated at a block 278, again using the CHKPAR routine of FIG. 6. The transmission counter is then initialized at a block 280.

At a block 282 the start bit is transmitted on the communication link 72, see FIG. 2, to the main escalator controller 18. A decision block 284 determines if the data value is one or zero. If zero, then the transmitter port is set high at a block 286. If the data is one, then the transmitter is set low at a block 288. From either block 288 or 286 the counter count value is decremented at a block 290 and at a decision block 292 decision is made if the transmission is done as by the counter count value being equal to zero. If not, then control returns to the block 284. If so, then a stop bit is transmitted at a block 294.

A decision block 296 then determines if the next switch in the series of switches, i.e., the switch 54 relative to the switch 52, has previously been turned on. At power-up, none of the subsequent switches in the series will have been turned on. Therefore, at a block 298 the next switch is turned on by passing the roll call signal from the MCU 60 to the power supply of the next smart switch. The flag bit 0 is also set to indicate for subsequent passes that the next switch has been turned on. From either the block 298 or if the next switch was already on, as determined at the decision block 296, then the receiver is enabled and flag bit 2 is cleared at a block 300. The interrupts are then enabled at a block 302 and the routine ends as by returning to the main loop 216 of FIG. 4, particularly the block 218.

Returning to the decision block 258, if the ID of the switch was previously set, indicating that roll call is not being performed, but instead a transmission received is for a standard polling, then control proceeds to a block 304 which determines if the address of the transmission is for the particular smart switch. If not, then the routine ends as by returning to the block 218. If the message is for that particular smart switch, then a decision block 306 determines if the message is a CLEAR ERROR message. If so, then the error bit is cleared at a block 308. If not, then control proceeds to the block 262 and subsequently to the block 264 to transmit a reply. Particularly, any time a transmission is received from the main escalator controller 18, then a reply is transmitted. The reply conventionally represents the current status of the particular smart switch.

Figure 8:
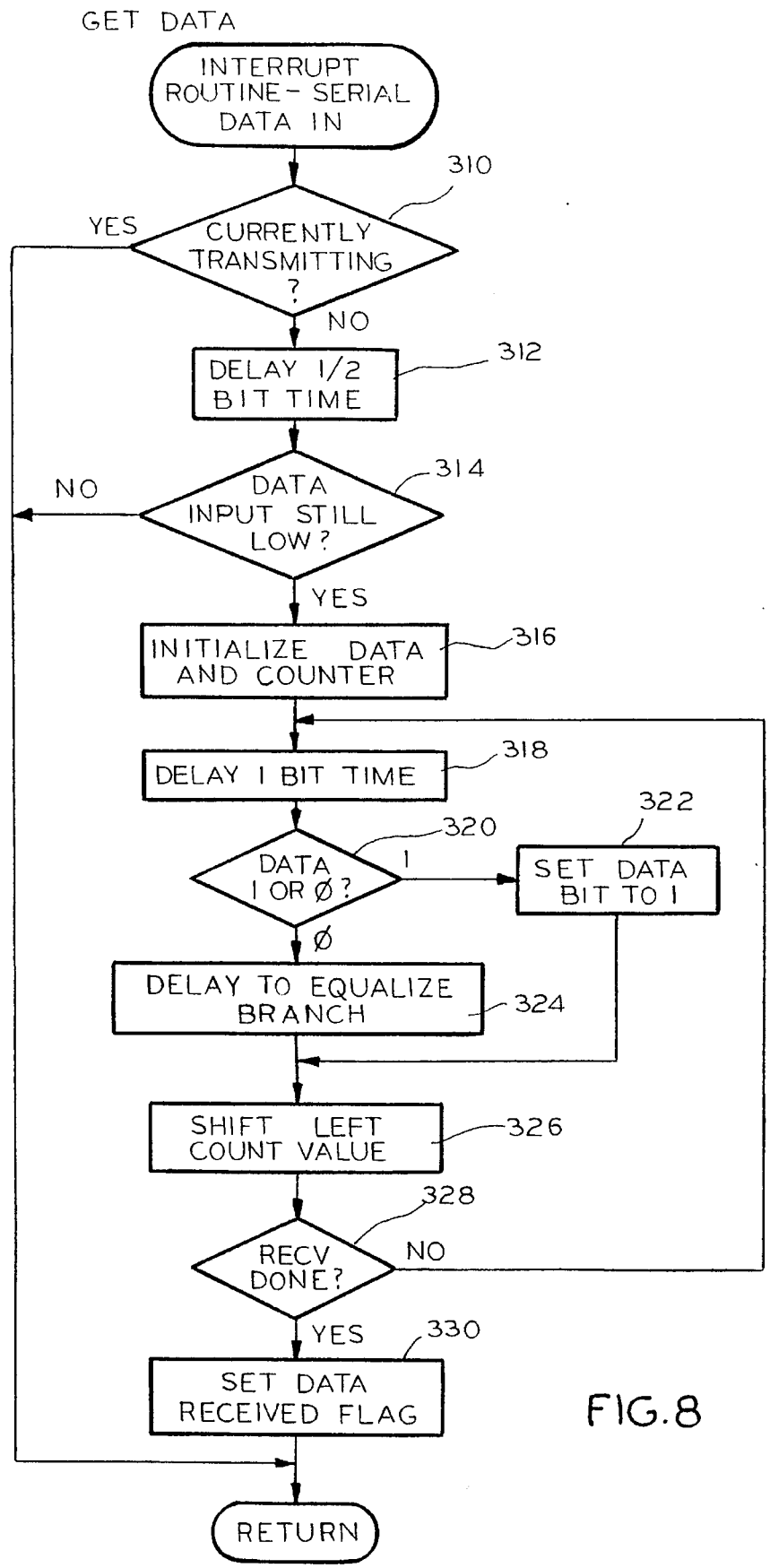

With reference to FIG. 8, a flow diagram illustrates a GETDATA routine also implemented by the microcontroller 60. The GETDATA routine is interrupt driven when serial data is received on the communication link 72. This routine begins at a block 310, which determines if the smart switch is currently transmitting. If so, then the routine ends. If not, then there is a delay of one-half bit time at a block 312, which acts as a noise filter. A decision block 314 determines if the data input is still low. If not, then the loop ends. If so, the data register and counter are initialized at a block 316 and a one bit time delay is implemented at a block 318. A decision block 320 then determines if the data received is a one or a zero. If one, then the data bit is set equal to one at a block 322. If zero, then the data bit is left alone and a delay is implemented at a block 324. At a block 326, the count value is shifted left and a decision block 328 determines if all data has been received based on the count value. If not, then control returns to the block 318. If so, then the data received flag is set at a block 330 and the routine ends.

As mentioned above, the GETDATA routine is implemented on a interrupt basis. Once data has been received and the data received flag is set at the block 330, then subsequently when the main loop 216 implements the block 236, then the received data is acted on thereafter, as by transmitting a reply at the block 264, discussed above.

Summarizing, when the main controller 18 is first powered up, the smart switches 52, 54, 56 and 58 are all off and decoupled from the communication link 76 because the contacts of each relay 64 are open. The main controller 18 develops a roll call signal to the first smart switch 52. When the first smart switch 52 receives the roll call signal, its power supply 62 is turned on, which in turn energizes the communication relay 64 to couple its MCU 60 to the communication link 72. The MCU 60 upon turning on, performs smart switch self-diagnostics, and listens for an ID assignment from the main controller 18. The smart switch 52 then communicates to the main controller 18 a confirmation of ID reception, as well as any errors found by self-diagnostics. Finally, the smart switch 52 initiates a roll call signal to the next smart switch 54 in the safety string. The second smart switch 54 repeats the above process. This process continues until the last smart switch 58, or any additional smart switches, finish the process of the roll call.

Thus, in accordance with the invention, the main escalator controller 18 can periodically poll the smart switches 52, 54, 56 and 58 as necessary or desired to determine which, if any, contact in the safety string has opened. Likewise, the controller 18 can cause a roll call to be initiated by enabling the roll call on the line 74 to do a roll call polling to determine the operative status of each of the smart switches 52, 54, 56 and 58.

The smart switch safety string is disclosed herein for use in connection with an escalator system. Such a circuit may also be used in connection with an elevator system. Particularly, Manske et al., U.S. Pat. No. 4,898,263, owned by the assignee of the present invention, the specification of which is hereby incorporated by reference herein, discloses a safety string in an elevator system. The safety string is shown to include a plurality of hard wired contacts. Such contacts could be replaced by smart switches of the type disclosed herein, with the main elevator controller utilizing the roll call system described herein. Additionally, the Manske et al. patent shows the use of call stations and other devices which communicate with the elevator control. Such call stations could also utilize smart switches and the roll call sequence described herein.

Particularly, the roll call feature can be used with any series of remote stations in the form of input and output devices, including safety switches, for determining the operative status of such a series of remote stations.

We claim:

1. A method of detecting the operative status of each of a series of remote stations connected to a main controller in an escalator or elevator system, comprising the steps of:

(a) causing the main controlling to develop a roll call signal which is transferred only to a first of the series of remote stations;

(b) transmitting an operative status reply signal from the remote station to the main controller if the remote station is functional following receipt of the roll call signal by the remote station;

(c) the functional remote station developing the roll call signal which is transferred to a next of the series of remote stations after the reply signal is sent to the main controller; and (d) repeating steps (b) and (c) until each of the remote stations has received the roll call signal.

2. The method of claim 1 wherein the main controller is coupled to each remote station via a communication link, and wherein in the step (b) the reply signal is transmitted on the communication link.

3. The method of claim 2 wherein the step (b) includes the step of the main controller transmitting address data to the remote station and the reply signal includes the transmitted address data.

4. The method of claim 1 wherein the main controller is connected to a communication link, and further comprising the step of connecting each remote station to the communication link upon the remote station receiving the roll call signal.

5. The method of claim 4 wherein the connecting step further includes the step of energizing a relay when the remote station receives the roll call signal, whereby contacts associated with the relay are closed to connect a microcontroller unit of the remote station to the communication link.

6. The method of claim 3 wherein the step (b) includes the step of the main controller transmitting new address data to a next of the series of remote stations only after a reply signal is received from one of the series of remote stations.

7. A method of detecting the operative status of each of a series of remote safety switches having a series connected status contact in a safety string connected to a main controller in an escalator or elevator system, comprising the steps of:

(a) causing the main controller to develop a roll call signal which is transferred only to a first of the series of remote safety switches;

(b) transmitting an operative status reply signal from the remote safety switch to the main controller if the remote safety switch is functional following receipt of the roll call signal by the remote safety switch;

(c) the functional remote safety switch developing the roll call signal which is transferred to a next of the series of remote safety switches after the reply signal is sent to the main controller; and (d) repeating steps (b) and (c) until each of the remote safety switches has received the roll call signal.

8. The method of claim 7 wherein the main controller is coupled to each remote safety switch via a communication link, and wherein in the step (b) the reply signal is transmitted on the communication link.

9. The method of claim 8 wherein the step (b) includes the step of the main controller transmitting address data to the remote safety switch and the reply signal includes the transmitted address data.

10. The method of claim 7 wherein the main controller is connected to a communication link, and further comprising the step of connecting each remote safety switch to the communication link upon the remote safety switch receiving the roll call signal.

11. The method of claim 10 wherein the connecting step further includes the step of energizing a relay when the remote safety switch receives the roll call signal, whereby contacts associated with the relay are closed to connect a microcontroller unit of the remote safety switch to the communication link.

12. The method of claim 9 wherein the step (b) includes the step of the main controller transmitting new address data to a next of the series of remote safety switches only after a reply signal is received from one of the series of remote safety switches.

13. In an escalator or elevator system including a series of remote stations connected to a main controller, a system for detecting the operative status of the remote stations comprising:

means for causing the main controller to develop a roll call signal which is transferred to a first of the series of remote stations;

means in each said remote station for transmitting an operative status reply signal from the remote station to the main controller if the remote station is functional following receipt of the roll call signal by the remote station;

means in each said remote station for developing and transferring the roll call signal to a next of the series of remote stations after the reply signal is sent to the main controller.

14. The system of claim 13 wherein the main controller is coupled to each remote station via a communication link, and wherein the reply signal is transmitted on the communication link.

15. The system of claim 14 wherein the main controller includes address transmitting means for transmitting address data to the remote station and the reply signal includes the transmitted address data.

16. The system of claim 13 wherein the main controller is connected to a communication link, and further comprising means for connecting each remote station to the communication link upon the remote station receiving the roll call signal.

17. The system of claim 16 wherein each said remote station includes a relay energized when the remote station receives the roll call signal, whereby contacts associated with the relay are closed to connect a microcontroller unit of the remote station to the communication link.

18. The system of claim 15 wherein the main controller address transmitting means transmits new address data to a next of the series of remote stations only after a reply signal is received from one of the series of remote stations.

19. In an escalator or elevator system including a series of remote safety switches series connected in a safety string to a main controller, a system for detecting the operative status of the remote safety switches comprising:

means for causing the main controller to develop a roll call signal which is transferred to a first of the series of remote safety switches;

means in each said remote safety switch for transmitting an operative status reply signal from the remote safety switch to the main controller if the remote safety switch is functional following receipt of the roll call signal by the remote safety switch;

means in each said remote safety switch for developing and transferring the roll call signal to a next of the series of remote safety switches after the reply signal is sent to the main controller.

20. The system of claim 19 wherein the main controller is coupled to each remote safety switch via a communication link, and wherein the reply signal is transmitted on the communication link.

21. The system of claim 20 wherein the main controller includes address transmitting means for transmitting address data to the remote safety switch and the reply signal includes the transmitted address data.

22. The system of claim 19 wherein the main controller is connected to a communication link, and further comprising means for connecting each remote safety switch to the communication link upon the remote safety switch receiving the roll call signal.

23. The system of claim 22 wherein each said remote safety switch includes a relay energized when the remote safety switch receives the roll call signal, whereby contacts associated with the relay are closed to connect a microcontroller unit of the remote safety switch to the communication link.

24. The system of claim 21 wherein the main controller address transmitting means transmits new address data to a next of the series of remote safety switches only after a reply signal is received from one of the series of remote safety switches.

* * * * *